June 24, 1930.    J. M. WESTERBERG    1,767,269
STRAINER FOR MILK PAILS
Filed Jan. 23, 1930
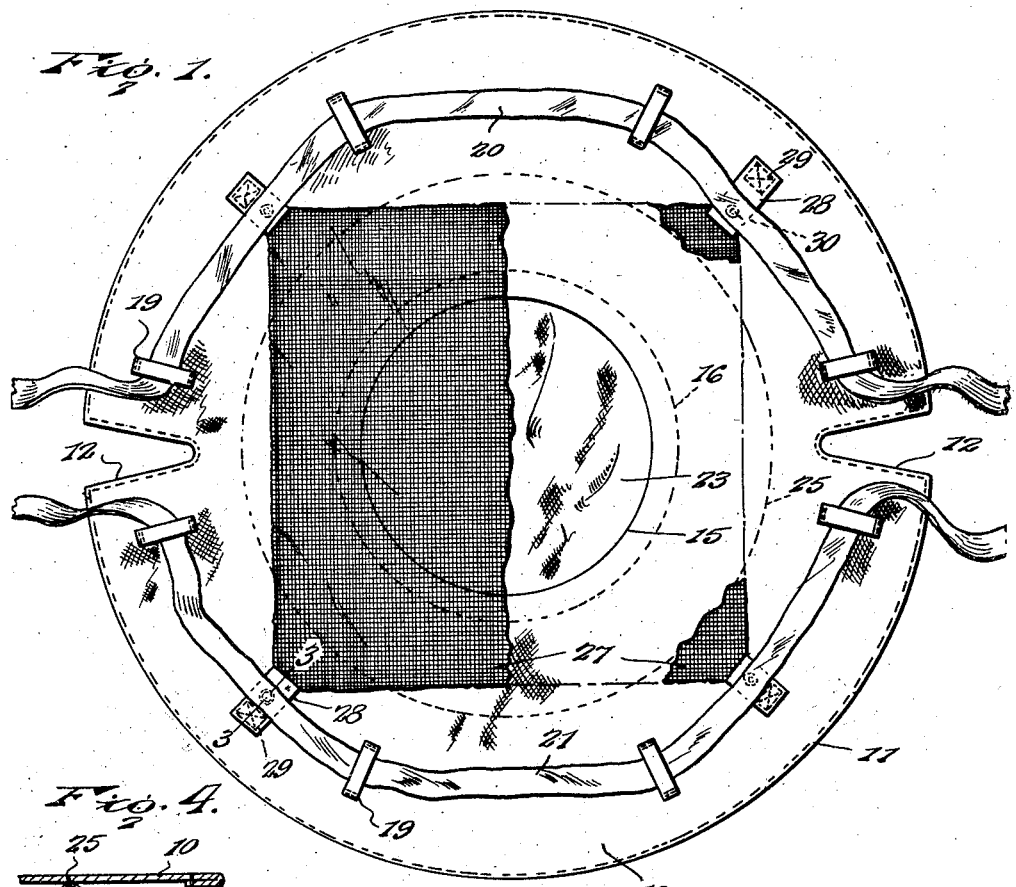
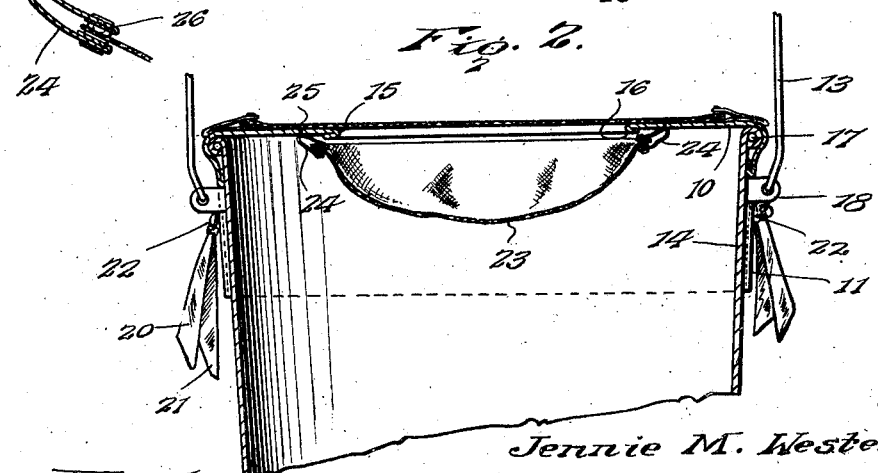
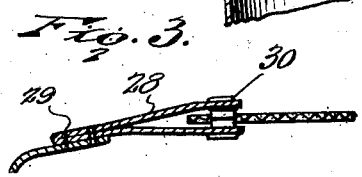
Inventor
Jennie M. Westerberg.
By Lacey & Lacey, Attorneys Patented June 24, 1930

1,767,269

UNITED STATES PATENT OFFICE

JENNIE M. WESTERBERG, OF BORING, OREGON

STRAINER FOR MILK PAILS

Application filed January 23, 1930. Serial No. 422,855.

This invention relates to detachable strainers for milk pails and has for an object to provide a strainer of this type which will be easily applied to and removed from the milk pail and will protect the contents from pollution during the milking operation and will further prevent spilling of the milk should the pail be accidentally struck.

A further object is to provide a milk strainer having a novel detachable anti-splash element which may be easily and quickly applied to the milk strainer and will be readily detachable for washing after use.

A still further object is to provide a milk strainer which will be devoid of metal parts with the exception of a plurality of small snap fasteners so that there will be no parts to rust or become broken and for this purpose the various elements of the strainer are formed of limp fabric having a novel securing tape for tightly fastening the device to the milk pail.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawing forming part of this specification,

Figure 1 is a plan view of the milk strainer removed and spread flat,

Figure 2 is a vertical sectional view through the upper portion of a milk pail showing my improved strainer applied thereto, Figure 3 is a detail sectional view on the line 3—3 of Figure 1, and Figure 4 is a detail sectional view showing the method of attaching the strainer to the cover.

Referring now to the drawing in which like characters of reference designate similar parts the milk strainer is shown to comprise a cover 10 which is preferably formed of strong canvas. The edge 11 of the cover is hemmed to prevent raveling and at diametrically opposite points in the edge there are formed substantially V-shaped recesses 12 which receive the bail 13 of the milk pail 14 when the cover is being applied to the pail.

The canvas cover is centrally provided with a circular orifice 15 which likewise is hemmed as shown at 16 to prevent raveling. The diameter of the orifice is as shown in Figure 2 sufficient to permit the orifice to extend over about three-fourths of the area of the mouth of the pail.

The outside diameter of the cover is sufficient to permit the cover to be turned downwardly upon the bead 17 of the milk pail and extend for some distance downwardly along the sides of the pail so that the cover may be snugly fastened to the pail underneath the hinge ears 18 of the bail 13 as will now be described.

A plurality of cloth loops 19 are sewed to the cover on the top thereof and a pair of cloth tapes 20 and 21 are trained through these loops. These tapes have their terminals confronting each other on opposite sides of the recesses 12 and are sufficient in length so that when the canvas cover is applied to the pail and the marginal portion thereof turned down over the sides of the pail, the tapes may be drawn tightly about the sides of the pail and knotted as shown at 22 underneath the hinge ears 18. The latter form stops to prevent dislodgment of the cover should the pail be accidentally struck during the milking process, while at the same time the tapes 20 and 21 firmly secure the cover in place so that the contents of the pail will not be spilled.

A strainer 23 preferably formed of muslin is secured to the underneath face of the canvas cover 10 and is sufficient in area to extend over the entire area of the opening 15 in the cover and sag considerably therebelow as best shown in Figure 2. For removably securing the strainer to the cover an annular loop 24 of fabric is sewed at the bight as shown at 25 to the cover and is equipped at spaced intervals with snap fasteners 26 which receive therebetween the circumferential edge portion of the strainer 23. It is clear that by simply unsnapping the fasteners the strainer may be detached from the cover for washing after each milking operation.

An anti-splash netting 27 is secured to the top face of the cover. Cheese cloth, gauze or like material may be utilized in the construction of the anti-splash member. The anti-splash netting is preferably formed square in outline and at the four corners is detachably secured to the cover by means of loop tapes 28 which are sewed at the bight to the cover as shown at 29 and are equipped terminally with snap fasteners 30 to receive the anti-splash netting. By simply unsnapping the snap fasteners the anti-splash netting may be easily and quickly removed for washing after each milking operation.

It will be understood that the cover 10 and the annular loop 24 are preferably formed of the same material that is duck, or heavy canvas so as to promote long life of these elements during frequent washing. The muslin strainer 23 and the netting of the anti-splash member 27 being constructed of comparatively delicate material may be frequently replaced at inappreciable expense.

Having thus described the invention, I claim:

1. A strainer for milk pails comprising a fabric cover having a central circular opening, a strainer secured to the underneath face of said cover at the edges of said opening and sagging below said opening, an anti-splash netting detachably secured to the upper face of said cover and extending over said opening, there being notches in the side of said cover to receive the bail of the milk pail, and a limp tie member for drawing the marginal portion of the cover tightly against the sides of the milk pail below the bail and thereby securing said cover to the milk pail.

2. A milk pail strainer comprising a fabric cover having a central opening and having V-shaped notches at diametrically opposite points therein, fabric loops secured to the top face of the cover, tapes trained through said loops for securing the cover to a milk pail, said tapes having their ends confronting each other on opposite sides of said notches and being of sufficient length to be knotted below the hinge ear of the milk pail bail, a strainer on the bottom face of said cover extending over said central opening, and an anti-splash member on the top face of said cover extending over said opening.

3. A milk pail strainer comprising a fabric cover having a central opening, an annular loop member sewed at the bight to the marginal portion of said opening and extending below said cover, snap fasteners at intervals near the free edges of said member, and a strainer cloth receivable within the loop of said member and removably secured thereto by said snap fasteners.

4. A milk pail strainer comprising a cover having a central opening, the edges of said cover being adapted to be turned downwardly along the sides of the milk pail, a limp tape for binding said marginal edge portion of the cover tightly against the sides of the pail below the bead thereof, a strainer cloth on the bottom face of the cover sagging below said opening, fabric loops sewed at the bights to the upper face of said cover and terminally equipped with snap fasteners, and an anti-splash netting receivable in said loops and detachably secured thereto by said snap fasteners.

In testimony whereof I affix my signature.

JENNIE M. WESTERBERG. [L. S.]